United States Patent
Measom et al.

(10) Patent No.: US 11,206,948 B2
(45) Date of Patent: Dec. 28, 2021

(54) DIRECT AND INDIRECT HEAT PELLET GRILL SYSTEM

(71) Applicant: Logan Outdoor Products, LLC, Hyde Park, UT (US)

(72) Inventors: Ty Measom, Logan, UT (US); Brett Bennett, Mantua, UT (US)

(73) Assignee: Logan Outdoor Products, LLC, Hyde Park, UT (US)

( * ) Notice: Subject to any disclaimer, the term of this patent is extended or adjusted under 35 U.S.C. 154(b) by 124 days.

(21) Appl. No.: 16/006,019

(22) Filed: Jun. 12, 2018

(65) Prior Publication Data

US 2018/0368618 A1 Dec. 27, 2018

Related U.S. Application Data (60) Provisional application No. 62/524,697, filed on Jun. 26, 2017.

(51) Int. Cl.
*A47J 37/07* (2006.01)
*A23B 4/052* (2006.01)

(52) U.S. Cl.
CPC .......... *A47J 37/0713* (2013.01); *A23B 4/052* (2013.01); *A23V 2002/00* (2013.01)

(58) Field of Classification Search
CPC .... A47J 37/0713; A47J 37/0786; A47J 36/00; A23B 4/052
USPC .................................................. 99/401, 447
See application file for complete search history.

(56) References Cited

U.S. PATENT DOCUMENTS

| | | | | |
|---|---|---|---|---|
| 3,683,791 A | * | 8/1972 | Rast, Jr. | A47J 37/0704 99/340 |
| 3,688,758 A | | 9/1972 | Stephen, Jr. | |
| 3,757,765 A | * | 9/1973 | Yamada | A47J 37/0688 126/41 R |
| 4,281,633 A | | 8/1981 | Wackerman | |
| 5,529,798 A | * | 6/1996 | Clark | A47J 37/0786 126/25 R |
| 5,653,159 A | * | 8/1997 | Quemin | A47J 37/0727 126/25 R |
| 5,878,739 A | * | 3/1999 | Guidry | A47J 37/0786 126/25 R |
| 5,890,422 A | * | 4/1999 | Clark | A47J 37/0786 99/447 |
| 6,279,566 B1 | * | 8/2001 | Craven, Jr. | A47J 37/0713 126/39 K |
| 6,283,114 B1 | * | 9/2001 | Giebel | F24C 3/103 126/41 R |
| 6,314,868 B1 | * | 11/2001 | Christensen | A47J 37/0713 126/25 R |

(Continued)

*Primary Examiner* — Jacob J Cigna
*Assistant Examiner* — Michael W Hotchkiss
(74) *Attorney, Agent, or Firm* — Amardeep S. Grewal; Gerard M. Donovan; Reed Smith LLP (57) ABSTRACT

The invention relates to a grill system that achieves direct and indirect heat functionality through one or more mechanisms including a heat deflector within the cooking chamber that is adjustable through a repositioning means that allows a user to reposition the heat deflector in relation to the burner from a location external to the cooking chamber when the grilling system is in cooking operation. The system may also provide a drip tray with louvers or other apertures placed over the burner area for further optimizing transfer of direct heat to the cooking area.

16 Claims, 6 Drawing Sheets

(56) References Cited

U.S. PATENT DOCUMENTS

| | | | |
|---|---|---|---|
| 6,622,716 B2 | 6/2003 | Cushing | |
| 6,609,512 B2 | 8/2003 | Poe, Jr. et al. | |
| 6,945,160 B2* | 9/2005 | Christensen | A47J 37/067 |
| | | | 126/25 R |
| 7,066,169 B2* | 6/2006 | Feldewerth | A47J 37/0713 |
| | | | 126/25 R |
| 7,241,466 B2* | 7/2007 | Dellinger | A47J 37/0713 |
| | | | 426/523 |
| 7,270,122 B2* | 9/2007 | Jones | A47J 37/0704 |
| | | | 126/25 R |
| 7,798,139 B2* | 9/2010 | Gagas | A47J 37/0704 |
| | | | 126/25 R |
| 8,037,879 B2* | 10/2011 | Murrin | A47J 37/0694 |
| | | | 126/39 B |
| 8,281,709 B2* | 10/2012 | Sacherman | A47J 27/002 |
| | | | 99/447 |
| 8,677,891 B2 | 3/2014 | Stier | |
| 8,739,693 B2 | 6/2014 | Stier | |
| 9,003,962 B2* | 4/2015 | Broerman | A23B 4/044 |
| | | | 99/482 |
| 9,149,153 B2* | 10/2015 | George | A47J 37/0786 |
| 9,204,657 B2 | 12/2015 | Cusack | |
| 9,877,610 B2* | 1/2018 | Bucher | A47J 37/07 |
| 10,694,892 B2* | 6/2020 | Colston | A47J 36/38 |
| 2004/0094142 A1* | 5/2004 | Christensen | A47J 37/067 |
| | | | 126/41 R |
| 2004/0255793 A1 | 12/2004 | Paz | |
| 2005/0098168 A1* | 5/2005 | Williams | A47J 37/0713 |
| | | | 126/25 R |
| 2007/0157918 A1* | 7/2007 | Becker | A47J 37/0704 |
| | | | 126/25 R |
| 2013/0298894 A1* | 11/2013 | Kleinsasser | A47J 37/0704 |
| | | | 126/25 R |
| 2015/0265099 A1* | 9/2015 | Coffie | A47J 37/0727 |
| | | | 99/339 |
| 2016/0174766 A1 | 6/2016 | Schlosser et al. | |
| 2018/0296031 A1* | 10/2018 | Terrell, Jr. | A47J 37/0704 |
| 2019/0125129 A1* | 5/2019 | Bittel | A47J 37/0713 |

* cited by examiner

DIRECT AND INDIRECT HEAT PELLET GRILL SYSTEM

RELATED APPLICATIONS

This application claims priority to a provisional patent application, U.S. Ser. No. 62/524,697, filed on Jun. 26, 2017, which application is also fully incorporated herein.

BACKGROUND OF THE INVENTION

Pellet grills are cookers that combine elements of charcoal smokers, gas grills, and kitchen ovens. They are fueled by wood pellets and infuse food with smoky flavor associated with charcoal grills and smokers, with the convenience of gas grills, and the temperature control of traditional indoor ovens. Pellet grills can smoke as well as grill and bake using an electronic control panel to automatically feed fuel to the fire, regulate the grill's airflow, and maintain consistent cooking temperatures. Despite increasing market differentiation in pellet grills, certain features and functionality remain elusive or suboptimal. For example, there is a notable absence of features in pellet grills that allow for direct heat operations, including optimal searing, grilling, and other direct heat-preferred methods.

SUMMARY OF THE INVENTION

In accordance with the above, a direct and indirect heat pellet grill system is provided. The system achieves both direct and indirect heat functionality in a pellet grill through one or more mechanisms comprising a cooking chamber, a burner adjacent to or within the cooking chamber, a heat deflector plate within the cooking chamber, the heat deflector plate location adjustable with respect to the burner; and heat deflector repositioning means that allows a user to reposition the heat deflector plate in relation to the burner from a location external to the cooking chamber when the grilling system is in cooking operation. The system also provides a drip tray with louvers or other apertures placed over the burner area for further optimizing transfer of direct heat to the cooking area. The problem of providing adjustable direct and indirect heat in a pellet grill is therefore solved.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through use of the accompanying drawings in which.

DETAILED DESCRIPTION OF THE ILLUSTRATED EMBODIMENT

Figure 1:
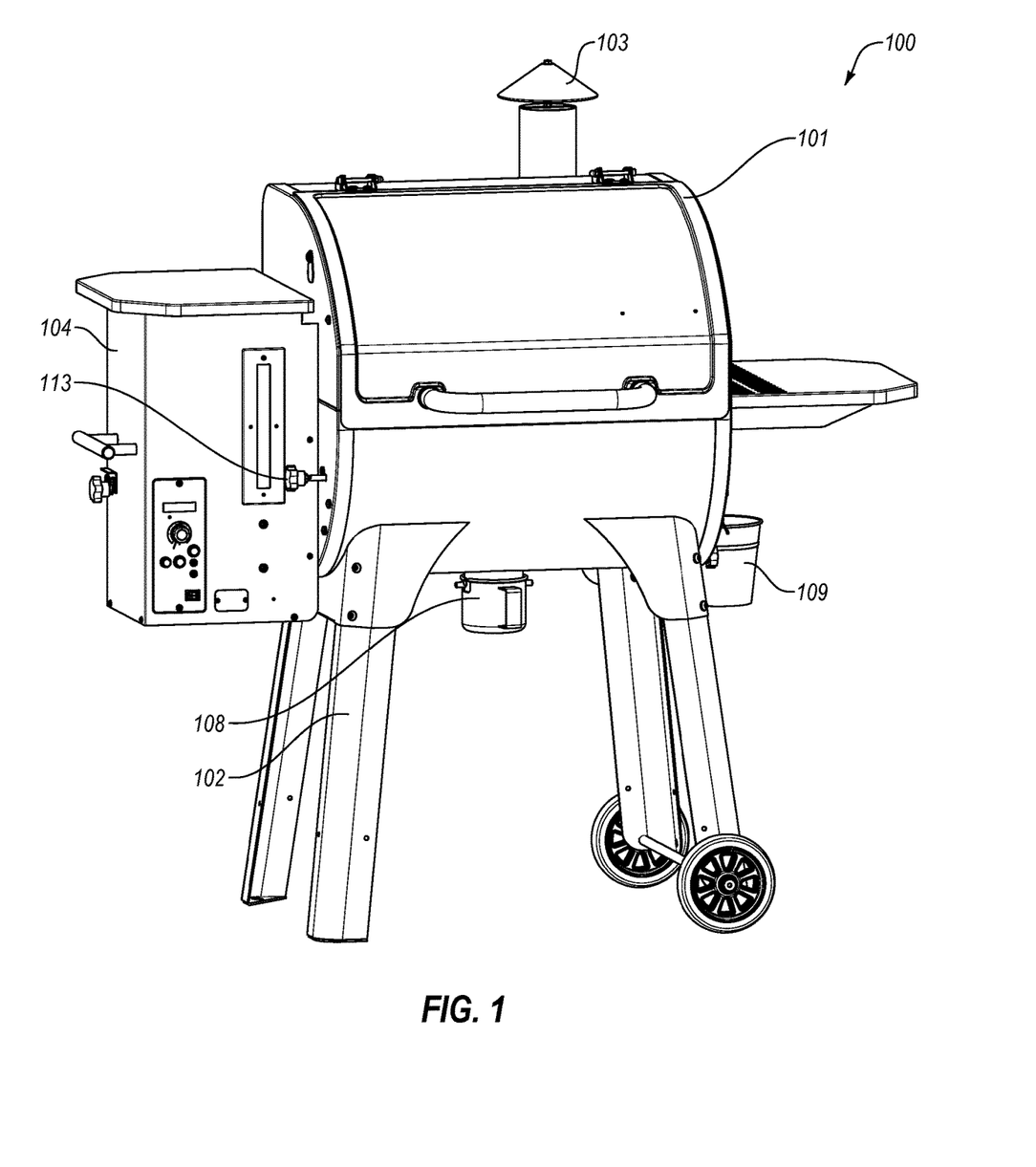
FIG. 1 is a front perspective view of one embodiment of a direct and indirect heat pellet grill system.
Figure 2:
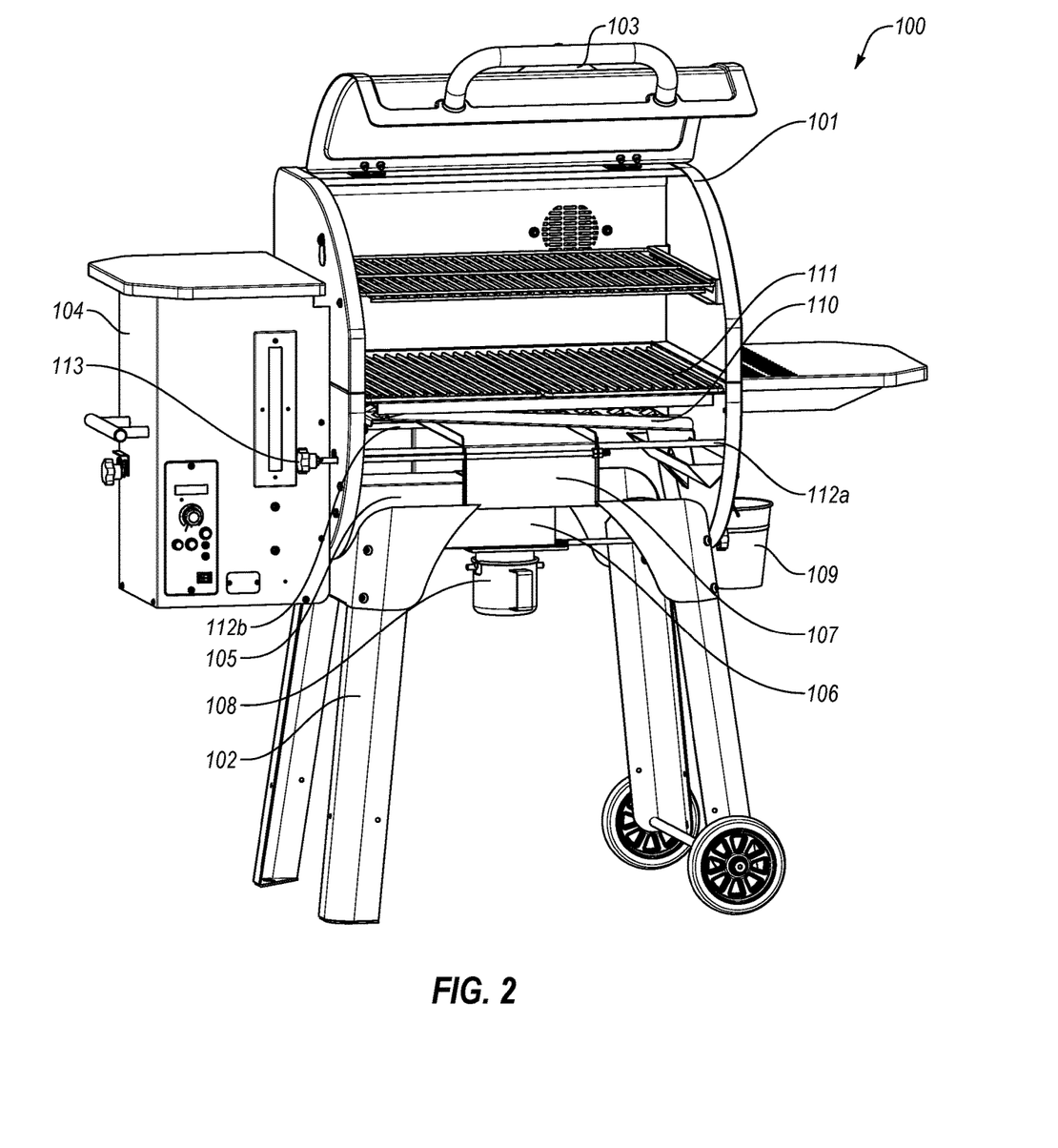
FIG. 2 is a front perspective view of one embodiment of an interior of a direct and indirect heat pellet grill system, with an open cooking chamber.

The present invention in its various embodiments, some of which are depicted in the figures herein, is a direct and indirect heat pellet grill system. FIGS. 1 and 2 depict one embodiment of the pellet grill system 100. In various embodiments, the system 100 may include (but is not limited to) a pellet grill with: a cooking chamber 101; one or more support legs 102; an exhaust vent and/or chimney 103; a pellet hopper 104; a pellet auger 105; a burner 106; a heat deflector plate 107; an ash collector 108; a drip bucket 109; a drip tray 110; and one or more cooking racks 111. Cooking chamber 101 may be substantially enclosed and have a body and one or more access panels for allowing a user to open and close the cooking chamber 101 during cooking operation. Any number of other features or components common to grills or pellet grill systems may be included. Likewise, the system structure described above and below may be incorporated within grills, stoves, or barbeques that are not pellet grills without departing from the purposes and scope of the invention.

The system 100 achieves variable heat functionality in a pellet grill through one or more mechanisms. For example, in preferred embodiments, the system 100 provides adjustable, direct and/or indirect heat within the cooking chamber 101 facilitated by a heat deflector plate 107 repositionable with respect to the burner 106. In various embodiments, heat deflector plate 107 has a top and two or more sides and is connected to and/or in communication with a pull rod 113, at least one end of which is accessible from the exterior of the cooking chamber 101. Heat deflector plate 107 is adjacent to, in communication with, and/or slidable on, one or more heat deflector plate rails or tracks 112a, 112b located within or adjacent to the cooking chamber 101, preferably near the bottom thereof. Depending on the embodiment, heat deflector plate 107 may be repositionable with respect to a burner 106 that is stationary and/or fixed within or adjacent to the cooking chamber 101.

In various embodiments, the pull rod 113 may form one or more of heat deflector plate rails 112a, 112b. Heat deflector plate 107, pull rod 113, and one or more heat deflector plate rails 112a, 112b collectively make up a heat deflector repositioning means that allows a user to reposition the heat deflector plate 107 in relation to a burner 106 from a location external to the cooking chamber 101 when the grilling system is in cooking operation. The heat deflector repositioning means therefore allows a user to select the location of the heat deflector plate with respect to the burner from among a number of different potential locations (some of which are described in more detail below) in order to achieve direct heat, indirect heat, or variations between in cooking operations.

Figure 3:
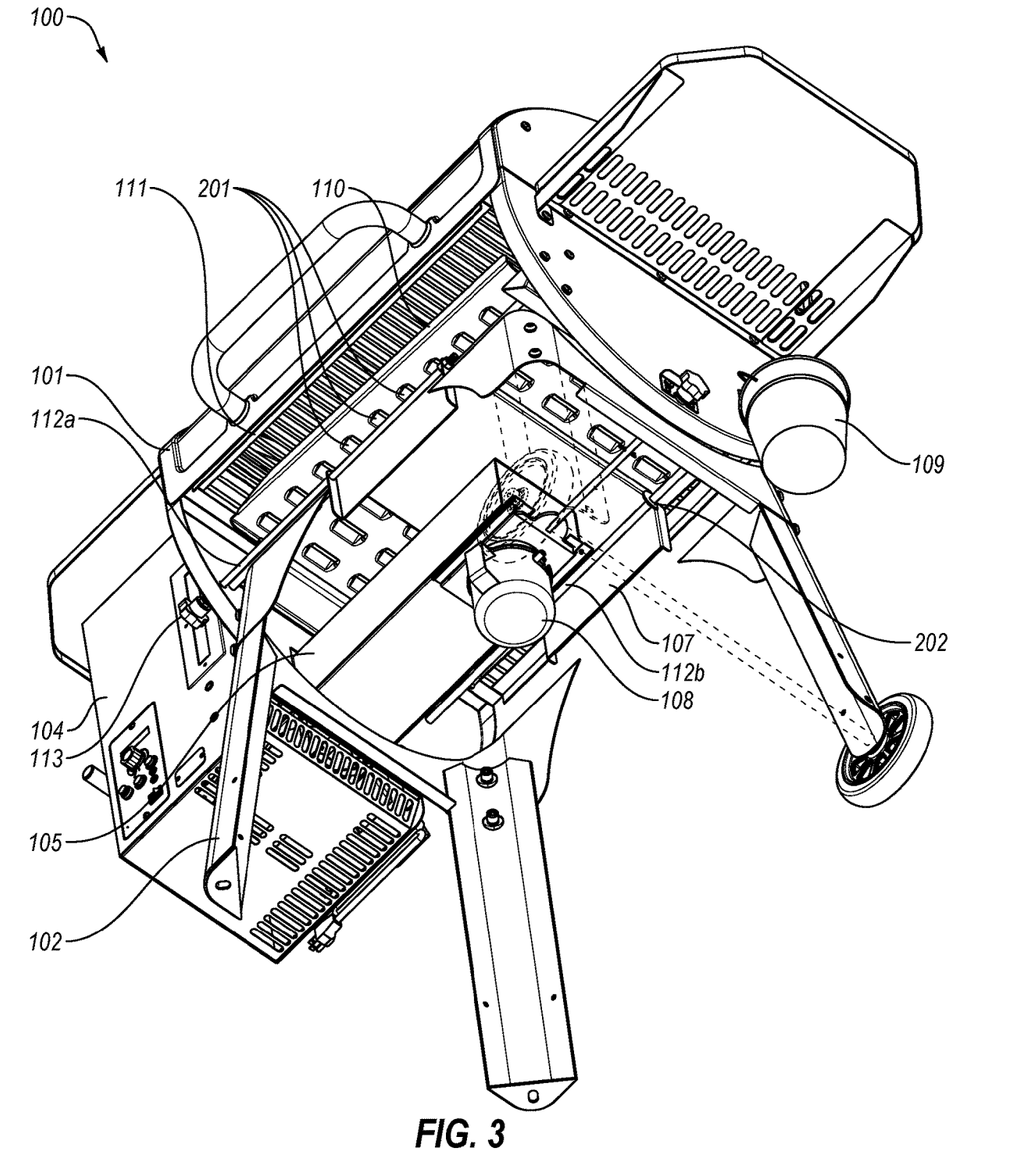
FIG. 3 is a bottom perspective, partial view of one embodiment of a direct and indirect heat pellet grill system.

Referring briefly to FIG. 3, in some embodiments, one or more stops 202 may be incorporated in or adjacent to the rails 112a, 112b to limit or govern the movement or positioning of the heat deflector plate 107. In the illustrated embodiment, rails 112a, 112b are be positioned on opposite sides of the burner 106 and parallel to a longitudinal axis of the cooking chamber 101. However, the heat deflector repositioning means, including the number and configuration of rails, may be structured in various different ways without departing from the purposes and scope of the invention.

Figure 4:
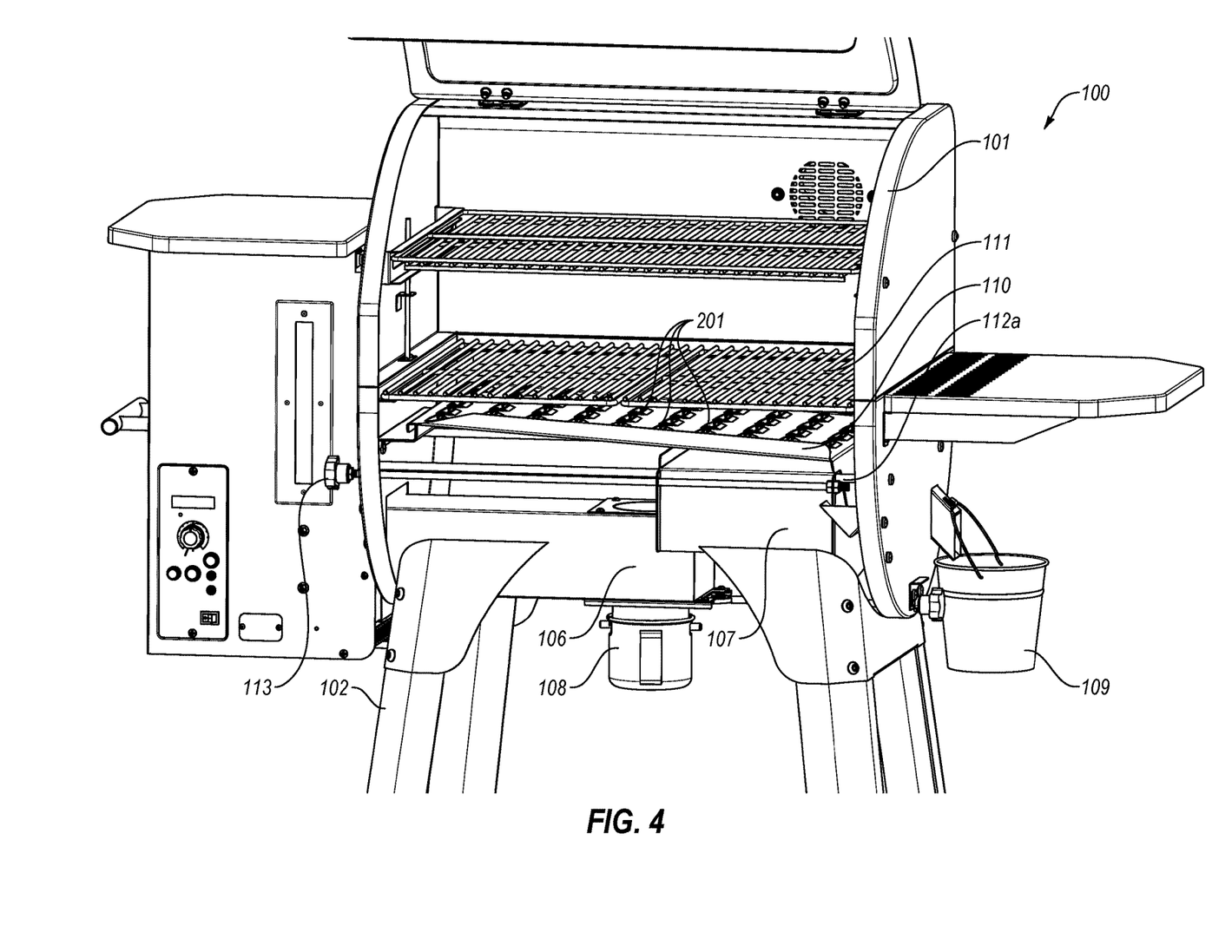
FIG. 4 is a front perspective, partial view of the cooking chamber of one embodiment of a direct and indirect heat pellet grill system with heat deflector in a first position.
Figure 5:
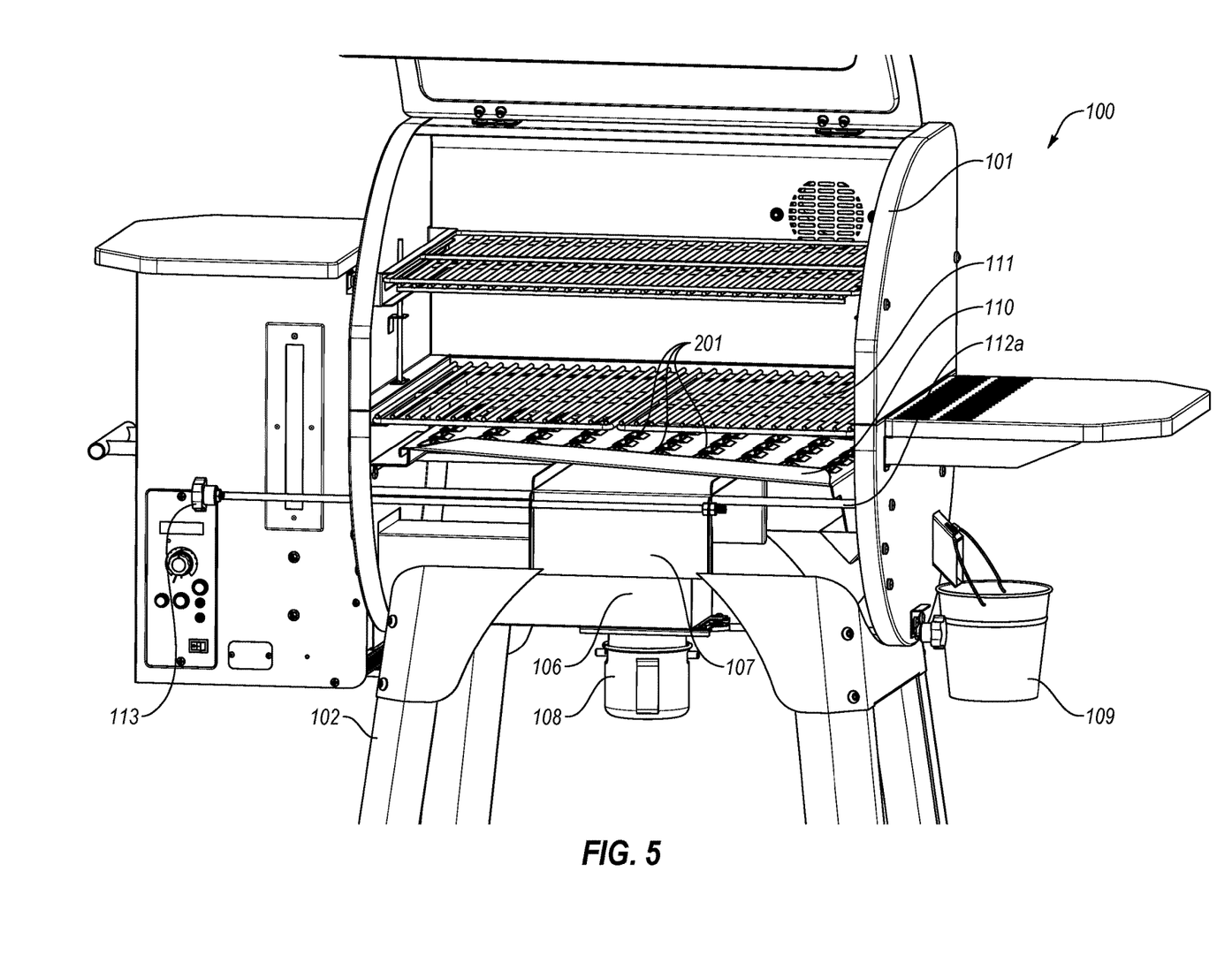
FIG. 5, is a front perspective, partial view of the cooking chamber of one embodiment of a direct and indirect heat pellet grill system with heat deflector in a second position.
Figure 6:
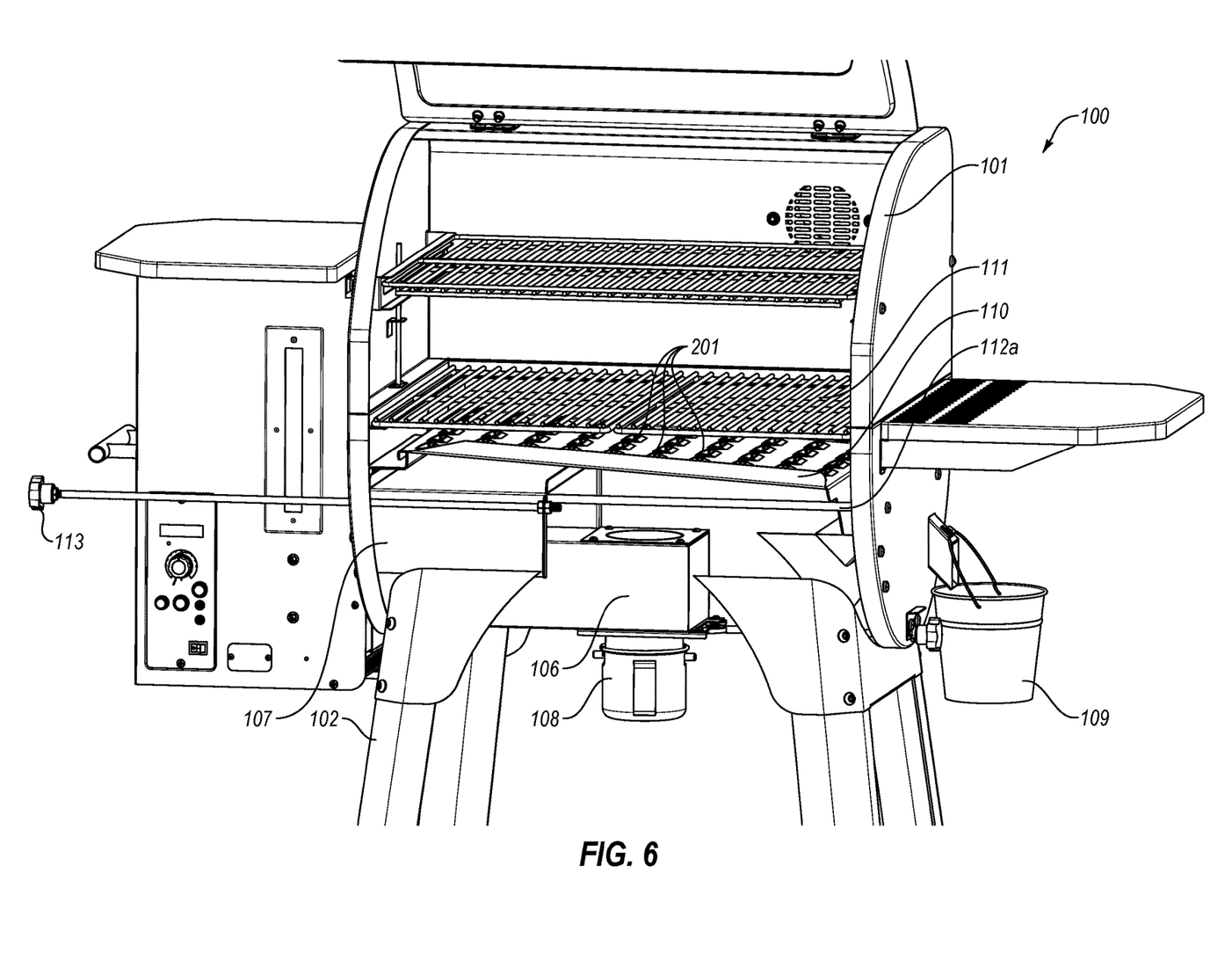
FIG. 6, is a front perspective, partial view of the cooking chamber of one embodiment of a direct and indirect heat pellet grill system with heat deflector in a third position.

FIGS. 4 through 6 show one example of the functionality and position options relating to the heat deflector repositioning means of the system 100. Referring now to FIGS. 4 and 6, the heat deflector plate 107 of the illustrated embodiment is capable of adjustment and/or placement to one or more positions generally to the right or left of the burner 106 for providing direct heat (e.g., for searing or grilling) to a cooking surface within the cooking chamber 101 during cooking operation. In such positions, the burner flame may hit the bottom of the drip tray 110 directly. Referring to FIG. 5, the heat deflector plate 107 is also capable of adjustment to a position generally above the burner 106 for providing indirect heat to a cooking surface within the cooking chamber 101 during cooking operation. In this position, the heat deflector plate 107 blocks the flame from the burner 106. Any number of intermediate positions or subsets of the above positions may be used to achieve a combination of direct and/or indirect heat. The system 100, may therefore be capable of a number of different cooking modes that correspond to the different positions of the heath deflector plate 107.

Direct heat functionality may also be enhanced in the system 100 through specific drip tray 110 configuration. Referring to FIG. 2, the drip tray 110 may have a plurality of fixed louvers or other apertures 201 which, when the drip tray 110 is in use, is located over or adjacent to the burner area to allow direct heat to the one or more cooking racks 111 when the heat deflector 107 is positioned away from the burner area for direct heat mode. Various embodiments may include louvers and/or other aperture configurations concentrated in certain areas or throughout the drip tray 110.

Thus configured, embodiments of the present invention provide a direct heat pellet grill system with adjustable, direct heat through an external pull rod capable of removing the grill's heat deflector from the burner area, and a drip tray with louvers or other apertures over the burner area. The problem of providing direct heat in a pellet grill for searing and/or grilling, in addition to the more traditional functions of a pellet grill, is therefore solved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A direct and indirect heat grilling system, comprising: a cooking chamber; a burner adjacent to the cooking chamber; a heat deflector within the cooking chamber, the heat deflector being configured to slide on one or more rails extending from an internal wall of the cooking chamber to an opposite internal wall of the cooking chamber; a rod coupled to the heat deflector and extending out of the cooking chamber through an opening in a wall of the cooking chamber, the rod being configured to displace the heat deflector on the one or more rails and thereby adjust a position of the heat deflector relative to the burner; and a drip tray comprising a plurality of buyers and a plurality of apertures located above the burner and the heat deflector and below one or more cooking racks.

2. The grilling system of claim 1 wherein the heat deflector is laterally repositionable with respect to the burner.

3. The grilling system of claim 1, wherein the grilling system is a pellet grill system.

4. The grilling system of claim 1, wherein the burner is stationary.

5. The grilling system of claim 1, wherein the cooking chamber has a body and access panel for allowing a user to open and close the cooking chamber during cooking operation.

6. The grilling system of claim 1, wherein the heat deflector is capable of adjustment to a first position generally above the burner for providing indirect heat to a cooking surface during cooking operation, and further capable of adjustment to a second position generally to a side of the burner for providing direct heat to a cooking surface during cooking operation.

7. The grilling system of claim 6, wherein the drip tray is configured to communicate direct heat from the burner when the heat deflector is in the second position.

8. The grilling system of claim 6 wherein the heat deflector may be selectively repositioned to one or more locations.

9. The grilling system of claim 8, wherein the one or more locations include generally above the burner, generally to the left of the burner, or generally to the right of the burner.

10. A direct and indirect heat pellet grill system, comprising:
a cooking chamber;
a stationary burner adjacent to the cooking chamber;
a heat deflector within the cooking chamber, the heat deflector being location adjustable with respect to the stationary burner between a first position, in which the heat deflector is positioned within the cooking chamber between the stationary burner and one or more cooking racks, and a second position, in which the heat deflector is positioned within the cooking chamber and to one side of the stationary burner;
a rod coupled to the heat deflector and extending out of the cooking chamber through an opening in a wall of the cooking chamber, the rod being configured to displace the heat deflector and thereby adjust a position of the heat deflector relative to the stationary burner; and
a drip tray comprising a plurality of louvers and a plurality of apertures, the drip tray being located entirely above the stationary burner and entirely above the heat deflector and below the one or more cooking racks.

11. The grilling system of claim 10 wherein the heat deflector is laterally repositionable with respect to the stationary burner.

12. The grilling system of claim 10 wherein the heat deflector may be selectively repositioned to a third position between the first position and the second position.

13. The grilling system of claim 10, wherein the cooking chamber has a body and access panel for allowing a user to open and close the cooking chamber during cooking operation.

14. The grilling system of claim 10, wherein the first position provides indirect heat to the one or more cooking racks during cooking operation, and wherein the second position provides direct heat to the one or more cooking racks during cooking operation.

15. The grilling system of claim 14, wherein the drip tray is configured to communicate direct heat from the stationary burner when the heat deflector is in the second position.

16. A direct and indirect heat pellet grill system, comprising:
- a cooking chamber;
- a stationary burner adjacent to the cooking chamber;
- a heat deflector within the cooking chamber, the heat deflector being configured to slide on one or more rails extending from an internal wall of the cooking chamber to an opposite internal wall of the cooking chamber;
- a rod coupled to the heat deflector and extending out of the cooking chamber through an opening in a wall of the cooking chamber, the rod being configured to displace the heat deflector and thereby adjust a position of the heat deflector relative to the stationary burner wherein the heat deflector is capable of adjustment to a first position generally above the stationary burner for providing indirect heat to a cooking surface during cooking operation, and further capable of adjustment to a second position generally to a side of the stationary burner for providing direct heat to the cooking surface during cooking operation; and
- a drip tray comprising a plurality of louvers and a plurality of apertures located above the stationary burner and the heat deflector and below the cooking surface.

\* \* \* \* \*

UNITED STATES PATENT AND TRADEMARK OFFICE
CERTIFICATE OF CORRECTION

PATENT NO. : 11,206,948 B2  
APPLICATION NO. : 16/006019  
DATED : December 28, 2021  
INVENTOR(S) : Ty Measom and Brett Bennett It is certified that error appears in the above-identified patent and that said Letters Patent is hereby corrected as shown below:

In the Claims

In Column 3, Line 65, change "comprising a plurality of buyers and a plurality of apertures" to -- comprising a plurality of louvers and a plurality of apertures --.

Signed and Sealed this
Twenty-fifth Day of April, 2023

Katherine Kelly Vidal
*Director of the United States Patent and Trademark Office*